United States Patent [19]

Pieper et al.

[11] 4,177,111

[45] Dec. 4, 1979

[54] PROCESS FOR THE RECOVERY OF DIMETHYLACYLAMIDES

[75] Inventors: Christian Pieper, Neuss; Surinder S. Sandhu, Dormagen; Günter Schümmer, Cologne; Karlheinz Feltgen, Dormagen, all of Fed. Rep. of Germany

[73] Assignee: Bayer Aktiengesellschaft, Leverkusen, Fed. Rep. of Germany

[21] Appl. No.: 809,494

[22] Filed: Jun. 23, 1977

[30] Foreign Application Priority Data

Jul. 15, 1976 [DE] Fed. Rep. of Germany ....... 2631734

[51] Int. Cl.$^2$ ...................... B01D 3/00; C07C 99/12; C07C 103/36
[52] U.S. Cl. ...................... 203/14; 203/26; 203/73; 203/71; 203/DIG. 9; 260/561 R
[58] Field of Search ...................... 203/26, 14, 91, 73, 203/98, 100, DIG. 4, DIG. 9; 260/561 R; 202/235, 154

[56] References Cited

U.S. PATENT DOCUMENTS

| | | | |
|---|---|---|---|
| 2,829,088 | 4/1958 | Pirot | 260/561 R |
| 3,072,725 | 1/1963 | Surman | 260/561 R |
| 3,230,155 | 1/1966 | Schürch | 203/26 |
| 3,342,862 | 9/1967 | Board | 260/561 R |
| 3,414,484 | 12/1968 | Carson et al. | 203/26 |
| 3,557,207 | 1/1971 | Hammond | 260/561 R |
| 3,558,702 | 1/1971 | Pasin et al. | 260/561 R |
| 4,056,444 | 11/1977 | Weicht et al. | 203/26 |

Primary Examiner—Wilbur L. Bascomb, Jr.
Attorney, Agent, or Firm—Sprung, Felfe, Horn, Lynch & Kramer

[57] ABSTRACT

The recovery of dimethylacylamides from solutions which are formed during the production of fibres is particularly economical if the solution is concentrated in a separating column to produce a sump product having a DMA content of 30 to 90% at pressures of more than 300 Torr, using the evaporation heat of the head product for heating the column, with the aid of a compressor and then separating the sump product which is concentrated in DMA by distillation.

4 Claims, 2 Drawing Figures

PROCESS FOR THE RECOVERY OF DIMETHYLACYLAMIDES

The invention relates to a process for recovering dimethylacylamides from solutions formed during the production of threads or fibres of acrylonitrile polymerizates or fibres or shaped elements of polyurethanes.

As is well known, dimethylformamide (DMF) and dimethylacetamide (DMA) are excellent solvents for acrylonitrile polymerizates, with whose aid acrylonitrile fibres with excellent qualities may be produced with both dry and wet spinning processes. These solvents are also used in the production of shaped elements and fibres from polyurethanes. The energies which must be expended for the regeneration of the solvent which is contaminated in the production process with water and possibly with other substances, are considerable. Therefore, several processes for recovering solvents have already been tried out. Some processes are based on extraction with an extraction agent which is immiscible with water and subsequent separation, wherein methylenechloride or acrylonitrile, for example, may be used as the extraction agent.

These processes however are only suitable if less than 15% of solvent is present in the mixture to be processed, since the distribution coefficients of the solvent between water and the extraction agent are relatively small.

For other mixtures having solvent contents of above 15%, rectification is suitable. Normal rectification has the drawback that it must be carried out under vacuum, wherein the pressure in the column should be below 300 Torr, so that the dimethylacylamides which are present in the mixtures and are unstable at higher temperatures do not decompose. Furthermore, it has the drawback that, during rectification, all the water, which as is known has a high heat of evaporation, must be evaporated and the high heat of evaporation of the water in the head product cannot usually be utilised since this heat occurs at a low temperature level of below 75° C.

The object of the present invention is to provide a more economical process for the recovery of the spinning solvent.

According to the invention, there is provided a process for the recovery of dimethylacylamides from solutions formed during the production of threads or fibres of acrylonitrile polymerizates or fibres or shaped elements of polyurethanes, wherein all the solutions formed which contain dimethylacylamide in amounts of up to 50% are pre-concentrated in at least one separating column, in which the sump product is concentrated to dimethylacylamide contents of 30 to 90% at pressures above 300 Torr, and the heat of evaporation of the head product is utilized, after compression, for heating the column, and the sump product, together with solutions which contain a high proportion of dimethylacylamides without preconcentration, are separated by distillation in a further distillation column.

The process according to the invention is described in detail below:

If the mixtures have high water contents, their boiling points are lower than mixtures with low water contents. Therefore, mixtures having high water contents may be distilled at higher pressures at sufficiently low temperatures to prevent decomposition from taking place. This decomposition must be checked since, on one hand, the decomposition products in the solvent lead to a yellowish or brownish discolouration of the polyacrylonitriles or polyurethanes and, on the other hand, it is very troublesome to remove them.

With solvent contents of less than 80%, the pre-concentrating column may operate under normal pressure. For pre-concentration it is advantageous to operate with pressures which are as high as possible since the smaller are the compressor and the exhaust connections the higher is the pressure from which the compression comes.

The use of a heat pump is basically known in the separation of multicomponent mixtures. The water vapour is used for heating the column after compression (German Auslegeschrift No. 1,114,168). During the recovery and purification of dimethylacylamides from solutions which occur during the dry spinning of polyacrylonitrile and polyurethane fibres (apart from the condensates in the spinning shafts), the pre-concentration and the addition of a heat pump known per se, with which water vapour is utilised for heating the column after compression, are particularly economical. The pre-concentrated solutions are preferably commonly purified with the highly concentrated solutions from the spinning shaft (condensate containing over 90% of dimethylacylamide) in a further column, in such a way that steam and the more volatile constituents are drawn off as a head product, the solvent is dawn off in the gas phase in a side stream, and the less volatile constituents in the sump are drawn off in the liquid and solid phase as a suspension.

Furthermore, it is very advantageous if the heat of evaporation of the solvent/steam removed in the side stream is utilised for heating the influx of the mixture into the pre-concentrating column. In order to utilise this heat economically, the pre-concentrations should not be carried too far.

The pre-concentration of mixtures with a low solvent content is particularly advantageously used in the production of fibres by the dry spinning process. Mixtures are produced therein by condensation of the vapours from the shaft, these mixtures containing more than 90% of solvent and obviously are not pre-concentrated. However, other mixtures having solvent contents of some 10 to 30% are also produced, which are advantageously up-graded according to the invention. All of the solvent/water mixtures which are not formed by condensation of the vapours in the spinning shaft are preferably purified and regenerated according to the invention.

The process for the recovery of dimethylformamide is preferably carried out. The pre-concentration need not be carried out under vacuum, since the boiling point of a solution containing water is lower than that of the pure solvent and therefore thermal decomposition of the dimethylacylamides is not brought about.

Figure 1:
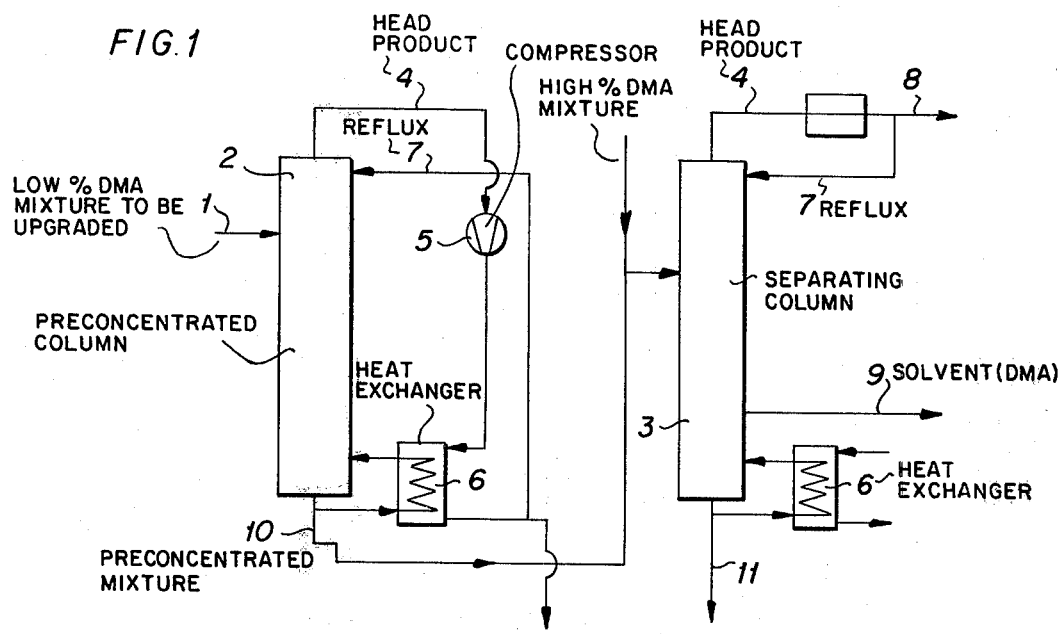
FIG. 1 shows a block diagram of the process according to the invention.

In FIG. 1, the mixture to be up-graded is introduced into the column 2 at 1. Column 2 serves to pre-concentrate; the complete separation is carried out in column 3. The more volatile components are led off as head product 4. The water vapour 4 is fed to the compressor 5 during pre-concentration and used at 6 for heating the pre-concentration column 2. Hot steam is introduced at this position for starting up the pre-concentrating column. 7 is a reflux and 8 an outlet. The concentrated mixture is removed from column 2 at 10 and introduced into column 3. The solvent is removed at 9. 11 is the sump outlet of column 3.

Figure 2:
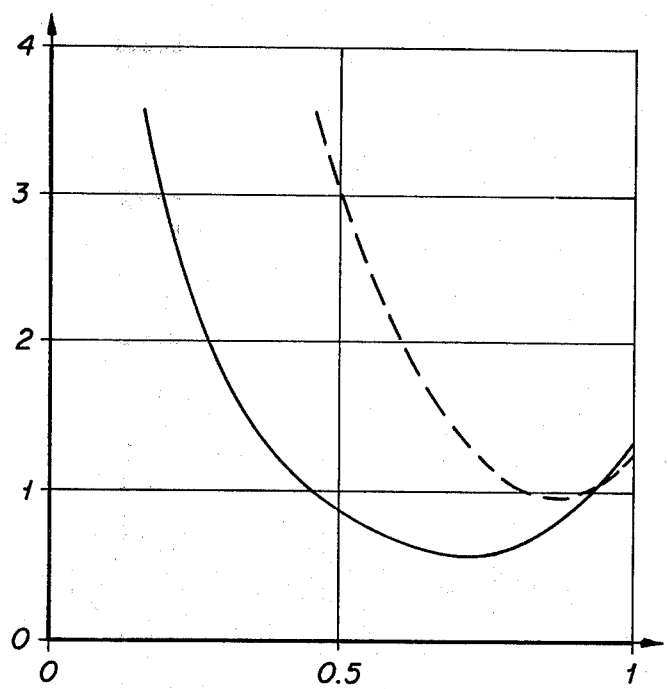
FIG. 2 shows the energy costs, dependent on the pre-concentration.

In FIG. 2, the decrease in energy costs through the pre-concentration is shown. During dry spinning, a mixture having a proportion of some 16% of dimethylformamides is produced for example. The energy costs are based on a quantitative unit of the water separated. In the evaluation, a ratio of the costs per energy unit of the type of energy, which is utilised for operating the separation apparatus and of the costs per energy unit of the type of energy which is used for operating the compressor is assumed to be from 1 to 2 and usual values for the working efficiency factor of the compressor, the heat of evaporation, etc., are added. It can be seen in the Figure that the course of the curve is relatively flat in the range 40 to 90%, so that the value upon which pre-concentration is based is not critical. A particularly advantageous range is between 50 and 80%. In this range, a saving may be achieved as compared with conventional distillation up to about 1:4.5.

Another example is sketched in the Figure (broken line). It relates to mixtures which occur during wet spinning of fibres from solutions of polyacrylonitrile in dimethylformamide and which contain starting contents from the start of about 45% of dimethylformamide. A considerable economy is attained if these mixtures are pre-fractionated to about 85%.

The process according to the invention is illustrated in the following Examples.

EXAMPLE 1

A mixture containing 97% of dimethylformamide and 3% of water is formed by condensation of the shaft vapour during the production of fibres by the dry spinning process from a spinning solution of polyacrylonitrile and dimethylformamide. Another mixture containing 16.2% dimethylformamide, 83.3% water and 0.5% solids which are dissolved in the mixture is also formed from the after-treatment. This mixture, which is formed at a temperature of 45° C., is pre-heated to 100° C. and fed to the 15th plate of a separating column which has 42 plates. The mixture is concentrated to 50% with a reflux ratio of 1:1. A temperature of 109° C. at a pressure of 910 Torr prevails in the sump of the column. A temperature of 100° C. at a pressure of 760 Torr prevails in the head. The vapour phase head product is drawn off and compressed to 1480 Torr and led into an evaporator in which the steam condenses. With the heat of condensation, the quantity of liquid which is required for operating the distillation is evaporated from the sump of the separating column. The condensate of the head product is utilised for heating the mixture inlet, has the pressure released and is partly used as reflux and partly as outlet or as rinsing fluid during the after-treatment of the fibres. It has a dimethylformamide content of 0.019%. An electrical energy of about 0.05 kWh is required per kg of compressed water vapour. 5 bar of steam are required to start up the pre-fractionating column. The heat exchanger, with which the heat of condensation is recovered has an area of 0.046 m² per kg of water vapour to be condensed.

The sump of the pre-concentrating column is fed to the 20th plate of a main column which has 40 plates. The condensed spinning cooler mixture is fed to the 15th plate of this column. Distillation takes place in the sump of this column at 122° C. and 360 Torr and in the heat at 66° C. and 200 Torr. The reflux ratio is 1.2. The head water contains 0.02% of dimethylformamide. 0.09% of water are found in the vapour phase dimethylformamide which is drawn off. The heat of evaporation of the dimethylformamide is utilised for heating the mixture which contains a lot of water and which is fed to pre-concentration. 2.876 kg of steam are required per kg of water which is fed to the main column. In this type of solvent recovery, 0.67 kg of steam are required per kg of water to be expelled. The recovered solvent has the same quality as that of a solvent recovered by normal distillation.

EXAMPLE 2

(Comparison; recovery with normal distillation).

In the composition of any solvent-containing mixtures which are formed during the production of fibres by the dry spinning method from a spinning solution of polyacrylonitrile and dimethylformamide, a mixture with a dimethylformamide content of 63% is obtained.

This mixture is separated in a distillation column with a reflux ratio of 1. Water having a dimethylformamide content of 0.07% is drawn off from the head of this column at a pressure of 220 Torr and a temperature of 67° C. in the form of steam. In the lower third of the column, dimethylformamide is drawn off in a side stream in the vapour form. A temperature of 125° C. and a pressure of 330 Torr is present in the sump. In order to evaporate a ton of water, 2.47 tons of steam are required at 5 atm.

What we claim is:

1. A process for the recovery of dimethylacylamides from mixtures containing dimethylacylamides and water formed during the production of synthetic fibers comprising: segregating low proportion dimethylacylamide and water mixtures containing up to 50% dimethylacylamide from high proportion dimethylacylamide and water mixtures containing greater than 90% dimethylacylamide, pre-concentrating the segregated low porportion mixtures which contain dimethylacylamide in amounts of up to 50% in at least one first distillation column, in which a sump product is concentrated to dimethylacylamide contents of 30 to 90% at pressures above 300 Torr and in which an overhead vapor product is formed, compressing the overhead vapor product and utilizing the latent heat of condensation of the overhead vapor product, after compression, for heating the first distillation column, and removing the sump product from the first distillation column and further distilling said sump product in a second distillation column along with nonpreconcentrated mixtures the latter which contain the high proportion of dimethylacylamides.

2. A process as claimed in claim 1, when used with mixtures formed during dry spinning, which mixtures are pre-concentrated to dimethylacylamide contents of 50 to 70%.

3. The process according to claim 1, wherein the fibers are composed of acrylonitrile polymerizates.

4. The process according to claim 1, wherein the fibers are composed of polyurethanes.

* * * * *